United States Patent

Klein et al.

[15] 3,647,280
[45] Mar. 7, 1972

[54] LIQUID CRYSTAL DISPLAY DEVICE

[72] Inventors: Richard Ira Klein, Edison; Sandor Caplan, Trenton, both of N.J.

[73] Assignee: RCA Corporation

[22] Filed: Nov. 6, 1969

[21] Appl. No.: 874,441

[52] U.S. Cl. .......................................... 350/160 R, 40/28 C
[51] Int. Cl. ........................................................... G02f 1/28
[58] Field of Search ........................... 40/28 C; 350/160 LC

[56] References Cited

UNITED STATES PATENTS

| 2,892,380 | 6/1959  | Baumann et al. | 350/160 LC |
| 3,410,999 | 11/1968 | Fergason et al. | 350/160 LC |
| 3,499,702 | 3/1970  | Goldmacher et al. | 350/160 LC |
| 3,524,726 | 8/1970  | DeKoster | 350/160 LC |

OTHER PUBLICATIONS

IBM Technical Disclosure Bulletin, Vol. 12, No. 10, March 1970, pp. 1697–1698.

Primary Examiner—Robert W. Michell
Assistant Examiner—Richard Carter
Attorney—Glenn H. Bruestle

[57] ABSTRACT

Front and rear substrates sandwich a liquid crystal material therebetween. The substrates are transparent, and each substrate has a layer of a conductive material on the inside surface thereof. A thin opening or line divides the conductive material layers into segments, at least one of the segments of each layer defining an image, the images of the two layers being different. A layer of dielectric material covers one of the conductive layers and has an opening therethrough defining a third image. Terminal means are provided for applying either fluctuating or DC voltages to various ones of the conductive layer segments.

7 Claims, 8 Drawing Figures

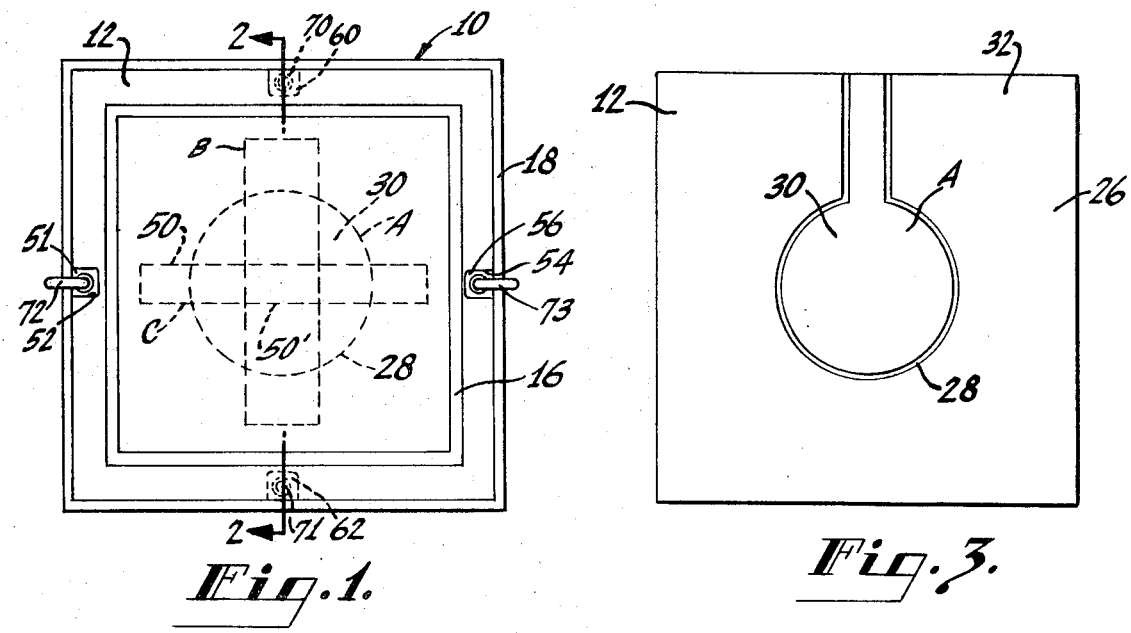
Fig.1.
Fig.3.
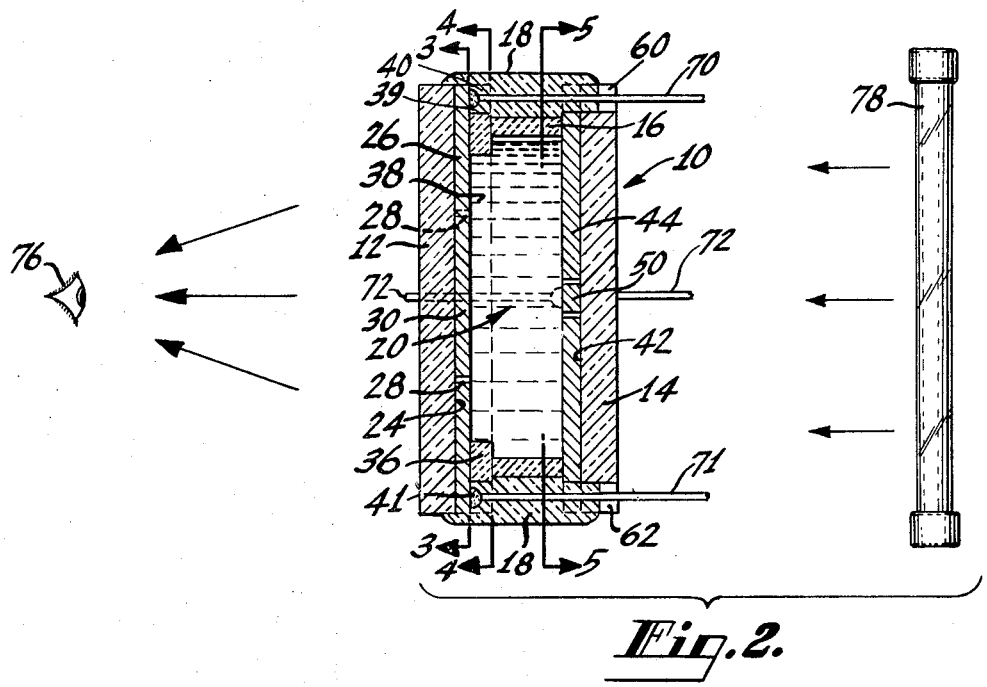
Fig.2.
INVENTORS
RICHARD I. KLEIN &
BY SANDOR CAPLAN
M.Y. Epstein
Attorney

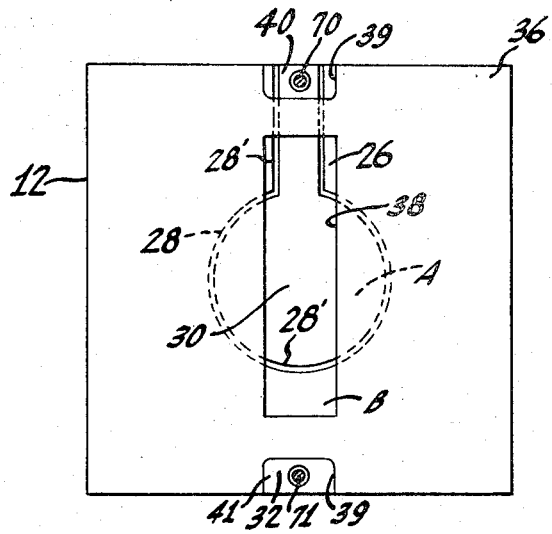
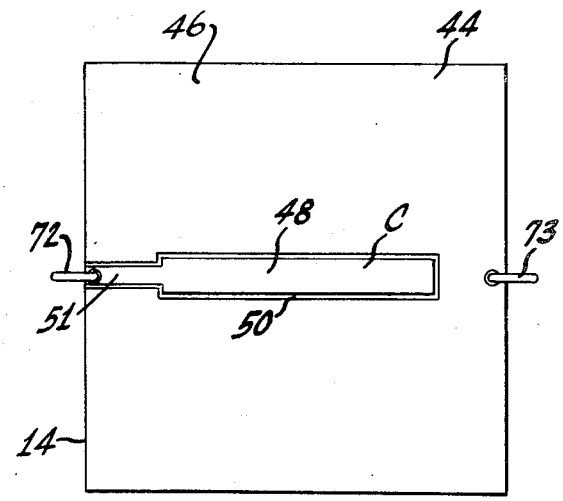
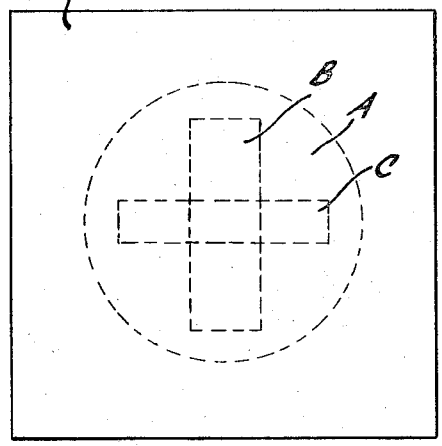
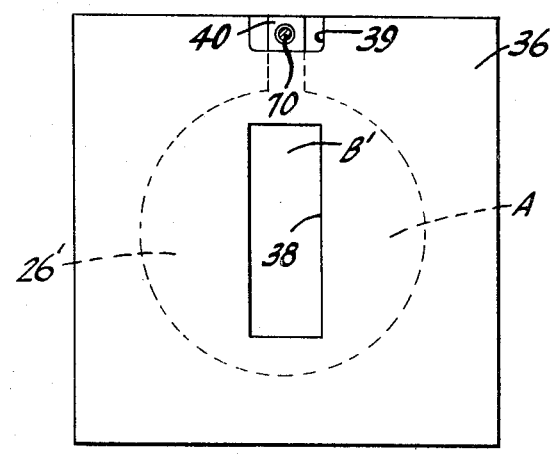
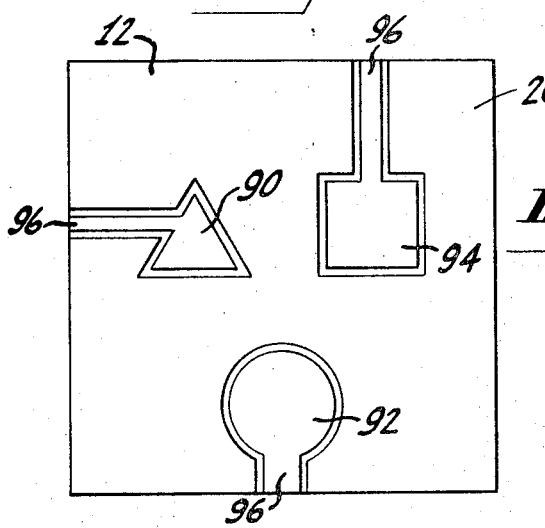
INVENTORS
RICHARD I. KLEIN &
BY SANDOR CAPLAN
M.Y. Epstein
Attorney

LIQUID CRYSTAL DISPLAY DEVICE

BACKGROUND OF THE INVENTION

This invention relates to liquid crystal display devices, and particularly to display devices of the type presenting a plurality of fixed images.

Certain types of liquid crystal devices comprise a pair of spaced insulating substrates and a liquid crystal material sandwiched therebetween. Each inside surface of the substrates includes one or more electrical conductors, whereby a voltage can be applied across the liquid crystal material to switch it from a normally transparent state to a light scattering state. Removal of the voltage returns the material to its light transparent state.

In one type of such device, two or more spaced-apart conductors on one of the substrates have the shapes of the images to be displayed. By applying a switching voltage between these shaped conductors and the conductor on the other substrate, the portions of the liquid crystal material disposed adjacent to the shaped conductors are switched to the light-scattering state, thereby making the images visible. A disadvantage of such devices, however, is that, because the various images are spaced apart, each of the images is somewhat smaller than the overall display area. Where multiple, but not simultaneously presented images are to be displayed, these devices are wasteful of space.

In another type of liquid crystal device, the inside surface of each substrate is provided with a plurality of parallel conductive strips, the strips on one surface being perpendicular to the strips on the other surface. By applying a voltage between two strips on opposite substrates, the segment of the liquid crystal material disposed between the intersection of the two strips is activated. Using known addressing circuits, various segments of the liquid crystal material can be activated, thereby providing various images. While any number of individual images, of varying sizes, can be thus produced, depending upon the programming of the addressing means, such a system is both complex and expensive.

DESCRIPTION OF THE DRAWINGS

FIG. 1 is a front view of a display device according to the invention;

FIG. 2 is a section along line 2—2 of FIG. 1;

FIGS. 3, 4, and 5 are sections along lines 3—3, 4—4, and 5—5, respectively, of FIG. 2;

FIG. 6 is a front view of a different embodiment of the invention;

FIG. 7 is a rear view of the front substrate and the layers thereon of the device shown in FIG. 6; and FIG. 8 is a sectional view similar to that of FIG. 3, but showing a still different embodiment of the invention.

DETAILED DESCRIPTION OF PREFERRED EMBODIMENTS

With reference to FIG. 1, a liquid crystal display device 10 is shown capable of presenting three different images, as follows: a first image A of a circle; a second image B of a vertical bar; and a third image C of a horizontal bar. As shown, the three images overlap one another.

The display device 10, as shown in FIGS. 1 and 2, comprises a pair of front and rear transparent glass substrates 12 and 14, respectively. The two substrates 12 and 14 are maintained in a spaced-apart relation by means of a shim 16 of an insulating material, e.g., mica. Disposed between the substrates 12 and 14, and maintained therebetween by the shim 16, as well as by a seal 18 of, e.g., glass frit, extending about the peripheries of the substrates 12 and 14, is a thin film 20, e.g., 0.0005 inch thick, of a liquid crystal material. In the instant embodiment, a nematic liquid crystal composition is used of the type that exhibits turbulent motion upon the passage of current therethrough, for example, the liquid composition anisylidene-p-aminophenylacetate, having an excess of mobile ions therein.

The liquid crystal material, hence, the film 20, is normally substantially transparent to light. However, when an electrical voltage sufficiently in excess of a threshold voltage is applied across the film, a current is caused to flow through it. The current flow causes turbulence in the film and places the liquid crystal material in a light-scattering state, i.e., it forward scatters light incident thereon. The scattering of light gives the material a somewhat milky or cloudy appearance. As the applied voltage is increased, the amount of scattering increases until the film 20 becomes substantially opaque to the passage of images therethrough. With further increases of voltage, the amount of light scattering reaches a maximum or saturation level, which is not increased by still further increases in voltage. When the electric field is removed, the liquid crystal returns to its transparent state.

Examples of other liquid crystal materials, and further details concerning the uses thereof, are described in U.S. Pat. No. 3,499,122, issued to Heilmeier et al. on Mar. 3, 1970.

The inside surface 24 of the front substrate 12 is coated with a thin layer 26 of a transparent electrically conductive material, e.g., a 1,000 A thick layer of tin-oxide. The first image A, a circle (FIGS. 1 and 3), is defined in the layer 26 by means of a fine opening or line 28 through the layer 26 dividing the layer 26 into two separate spaced-apart segments 30 and 32. The line 28 is wide enough to provide electrical isolation of the segments 30 and 32, for the voltages used in the device, but is quite narrow in comparison with the size of the first image. Design parameters of an illustrative device 10 are provided hereinafter.

The segmented layer 26 can be provided by known techniques, e.g., sputtering of the conductive material onto the substrate 12, and selective etching of the layer 26 to provide the line 28.

Covering portions of the layer 26 is a thin layer 36 (FIG. 2) of a transparent dielectric material, e.g., a 5,000 A thick layer of silicon dioxide or silicon nitride. An opening 38 (FIG. 4) is provided through the layer 36 exposing a portion of the conductive layer 26. The opening 38 defines the second image B, a vertical bar.

The opening 38, it is noted, overlies and exposes portions 28' of the line 28 through the conductive layer 26. This affects the appearance of the second image B, as described hereinafter. Also, openings 39 are provided through the layer 36 to expose peripheral portions 40 and 41 of the two segments 30 and 32, of the layer 26. This facilitates the making of electrical connections to the segments 30 and 32, as described hereinafter.

Covering the inside surface 42 (FIG. 2) of the substrate 14 is a thin layer 44 of a transparent electrically conductive material, e.g., a 1,000 A thick layer of tin-oxide. The layer 44 is segmented (FIG. 5) into two spaced-apart segments 46 and 48 by means of a thin opening or line 50 formed, e.g., by etching, through the layer 44. The segment 48 defines the third image C, a horizontal bar. A portion 51 of the segment 48 extends to the edge of the substrate 14.

In a different embodiment, not shown, the dielectric layer 36 covers the layer 44 on the substrate 14 rather than, as in the illustrative device 10, the layer 26 on the substrate 12.

Terminal means are provided for making separate electrical connections to each of the four segments 30, 32, 46, and 48. To this end, peripheral notches 52 and 54 (FIG. 1) are provided through the substrate 12 to expose the extending portion 51 of the segment 48 and a peripheral portion 56 of the segment 46 on the substrate 14. Likewise, notches 60 and 62 (FIG. 2) are provided through the substrate 14 to expose the peripheral portions 40 and 41 of the segments 30 and 32, respectively, on the substrate 12. As previously noted, the peripheral portions 40 and 41 of the layer 26 are exposed by the openings 39 through the layer 36 (FIG. 4). Fine leads 70, 71, 72, and 73, are connected to the exposed segment portions 40, 41, 51, and 56, respectively, by, e.g., a silver epoxy paste.

In operation of the device 10, the device is disposed between a viewer 76 (FIG. 2) and a source of illumination, e.g., a fluorescent bulb 78.

With no voltage applied to the device 10, the liquid crystal film 20 is transparent, and the front viewing surface of the device appears uniformly illuminated by the light source 78.

To display the first image A, i.e., the circle, a fluctuating switching voltage, either AC or pulsed DC is applied between all of the conductive layer 44 on the substrate 14, via the leads 72 and 73, and the first image defining segment 30 of the conductive layer 26 on the substrate 12, via the lead 70. No voltage is applied to the segment 32 of the layer 26. The portion of the liquid crystal material film 20 between the segment 30 and the conductive layer 44, and only that portion, is thus switched into the light scattering state. Stated differently, a fluctuating current path is created through the film 20, the path having a cross-sectional shape corresponding to the shape of the segment 30. Owing to the scattering of the light by the switched portion of the film, this film portion, having the shape of the circle image A, appears less bright to the viewer than the surrounding transparent portions of the film 20. The circle is thus displayed as a dark image on a light background.

By proper selection of the magnitude of the energizing voltage, the presence of the dielectric layer 36 on the conductive layer 26 has little effect upon the appearance of the first image A. Where the opening 38 (FIG. 4) through the layer 36 exposes portions of the image A defining segment 30, the liquid crystal film 20 is in direct contact with the segment 30 (FIG. 2) and the voltage on the segment 30 is coupled directly to the liquid crystal film 20. Where the segment 30 is covered by the layer 36, and thus separated from the film 20 thereby, the fluctuating voltage on the segment 30 is coupled to the film 20 capacitively through the dielectric layer 36. By using a sufficiently high voltage, all portions of the film 20 opposite the segment 30 are driven into or close to the saturation level of light scattering regardless of the difference in coupling between the different portions of the film 20 and the segment 30. Thus, the degree of light scattering is substantially uniform over the entire extent of the switched film portion.

To the extent that the segment 30 defining the image A overlies portions 50' (FIG. 1) of the line 50 defining the image C, these line portions 50' appear as bright lines in the dark circle image. This occurs because the portions of the liquid crystal film 20 disposed between these line portions 50' and the segment 30 are not exposed to a switching voltage and thus remain transparent. By the use of a segmenting line 50 of small width, in comparison with the size of the displayed image, the thin, bright light is not objectionable.

To display the second image B, i.e., the vertical bar, a DC switching voltage is applied between all of the conductive layer 26, via the leads 70 and 71, and all of the conductive layer 44, via the leads 72 and 73.

Since a DC voltage is used, only these portions of the liquid crystal film 20 directly engaged with the conductive layer 26 through the opening 38 in the dielectric layer 36 are switched to the light-scattering state. The other portions of the film separated from the conductive layer 26 by the dielectric layer 36 are electrically isolated from the DC voltage on the layer 26, and are not switched from the transparent state. Stated differently, a direct current path is created through the film 20, the path having a cross-sectional shape corresponding to the shape of the opening 38.

Thus, a dark image of the vertical bar, corresponding to the shape of the opening 38 (FIG. 4) through the dielectric layer 36, is provided on a light background.

Again, to the extent that the layer 36 opening 38 overlies portions 28' (FIG. 4) of the line 28 in the conductive layer 26, or portions of the line 50 in the conductive layer 44 (FIG. 1), these line portions appear as bright lines in the dark image.

With respect to the formation of the second image B, it is noted, it is immaterial whether the dielectric layer 36 covers the layer 26, as in the illustrative embodiment, or the layer 44.

To display the third image C, i.e., the horizontal bar, an AC voltage is applied between the segment 48 (FIG. 5) of the layer 44, via the lead 72, and all of the conductive layer 26, via the leads 70 and 71. No voltage is applied to the segment 46 of the layer 44.

Again, using a sufficiently high exciting voltage to excite the film 20 into or close to its saturated light-scattering level, the presence of the dielectric layer 36 has little or no affect upon the appearance of the third image. Also, to the extent that the image C overlies portions of the line 28 of the image A (FIG. 1), these line portions appear as bright lines in the dark third image.

In the device 10, it is noted, portions of projections of each image A, B, and C fall outside the outlines of the other images. Stated differently, projections of the images A and B overlie both segments 46 and 48 of the conductive layer 44, and projections of the images B and C overlie both segments 30 and 32 of the conductive layer 26. The segment 32 surrounding the image A defining segment 30 is thus necessary, in this embodiment, to serve as an electrode in the formation of the images B and C. Likewise, the segment 46 surrounding the image C defining segment 48 is necessary, in this embodiment, to serve as an electrode in the formation of the images A and B.

Another embodiment of the invention is shown in FIGS. 6 and 7. In this embodiment, the second image B, the vertical bar, and the third image C, the horizontal bar, are both smaller, and lie entirely within the confines of the first image A, the circle. Owing to this dimensional relationship of the images, the conductive layer 26' (FIG. 7) on the front substrate 12 comprises merely a single segment (plus a connector extension 40 therefor) having the shape of the circle image A. That is, since projections of both the second and third images B and C fall within the outline of the conductive layer 26' defining the image A, no additional conductive material on the substrate 12, surrounding the image A defining layer, is required for the formation of the images B and C.

In another embodiment, not illustrated, projections of the first and second images, defined by the conductive layer on the substrate 12 and the opening through the dielectric layer thereon, respectively, fall entirely within the outline of the third image, defined by the conductive layer on the substrate 14. In this embodiment, the latter layer comprises only one segment which defines the third image. As in the embodiment shown in FIGS. 6 and 7, additional conductive material on the substrate 14, surrounding the third image defining segment, is not required in the formation of the first and second images.

It will be appreciated that fewer, or more, images can be provided in devices of the type herein described. For example, if only two images are required, the images can comprise a first image defined by the conductive layer on the substrate 12, and a second image defined by the opening through the dielectric layer on the substrate 12. The conductive layer on the rear substrate 14, in this embodiment, does not define an image, but serves merely as an electrode in the formation of the first and second images.

To provide more than three images, although not overlapping, either or both of the conductive layers on the substrates 12 and 14 can be provided with two or more image defining segments. As shown in FIG. 8, for example, the conductive layer 26'' on the substrate 12 is provided with three segments 90, 92, and 94, defining images of a triangle, a circle, and a square, respectively. Leads, not shown, are provided connected to an extending portion 96 of each segment, whereby individual ones, or combinations of images can be provided.

In another embodiment, not illustrated, a layer of metal having a front facing, i.e., towards the front of the device 10, specular surface is provided on the rear substrate 14, either on the outside surface thereof, or on the substrate inside surface 42 beneath the conductive layer 44. Alternately, the layer 44 can comprise a layer of metal, e.g., aluminum, having a front facing specular surface.

In the use of this embodiment, a light source is disposed on the same side of the device as the viewer, but in such position relative to the viewer, that light from the source reaching the specular surface of the device is reflected in directions away from the viewer. Thus, with no voltage applied to the device, and the film 20 in its transparent state, the surface of the device appears uniformly nonilluminated. When a voltage is applied to the device to switch portions of the film 20 to the light-scattering state, light from the source, incident on the device through the front substrate 12 thereof, is scattered by these switched positions towards the specular surface, is reflected from the specular surface back through the switched portions of the film, and is again scattered, this time through the front substrate in directions including directions towards the viewer. Since light now reaches the viewer from the switched film portions, these portions appear luminous. Thus, by switching to the light-scattering state portions of the film 20 corresponding to the images to be displayed, as described herein, the various images appear luminous against a dark background.

In one embodiment, each of the substrates 12 and 14 is 125 mils thick; the circle image A has a diameter of 1 inch; the vertical bar image B measures 1,600 by 400 mils; the horizontal bar image C measures 1,600 by 200 mils; and the lines 28 and 50 have a width of 2 mils. with the aforedescribed film 20, the activating voltages comprise a 40 volt, r.m.s., 60 Hz. AC voltage to provide the images A and C, and a 40-volt DC voltage to provide the image B.

We claim:

1. A display device comprising:
   front and rear substrates, said front substrate being transparent, and a liquid crystal material disposed between said substrates;
   first and second electrical conductors on the inside surfaces of said front and rear substrates, respectively; said first conductor being transparent;
   one of said conductors including a segment defining a first image;
   a dielectric material disposed between either of said conductors and said liquid crystal material and having an opening therethrough defining a second image; and
   terminal means for applying a fluctuating voltage between said segment and the other of said conductors, and for applying a DC voltage between said conductors.

2. A display device as in claim 1 wherein a projection of said first image onto the inside surface of the other of said substrates falls within the outline of the other of said conductors, and a projection of said second image onto each of said inside surfaces falls within the outline of each of said conductors on said surfaces.

3. A display device as in claim 2 wherein said other conductor includes a segment defining a third image, a projection of which on said inside surface of said front substrate falls within the outline of said one conductor.

4. A display device as in claim 2 wherein said one conductor comprises two electrically isolated segments, and said terminal means include separate connections to each of said segments.

5. A display device as in claim 4 wherein said other conductor includes a segment defining a third image, a projection of which on said inside surface of said front substrate falls within the outline of said one conductor.

6. A display device as in claim 5 wherein said other conductor comprises two electrically isolated segments, and said terminal means include separate connections to each of said segments.

7. A display device comprising:
   a pair of spaced-apart oppositely disposed substrates one of which is transparent;
   a film of liquid crystal material disposed between said substrates;
   a layer of conductive material on the inside surface of each of said substrates providing a fluctuating current path through said film from one of said substrates to the other of said substrates, said fluctuating current path defining a first image;
   a dielectric layer disposed on one of said conductive layers and having an opening therethrough providing a direct current path from one of said substrates to the other of said substrates, said direct current path defining a second image; and
   terminal means connected to each of said conductive layers for applying a voltage therebetween.

* * * * *